Feb. 3, 1970   G. BRUNER   3,493,178
EJECTION NOZZLE DEVICE FOR JET AIRCRAFT
Filed Oct. 16, 1967   3 Sheets-Sheet 3
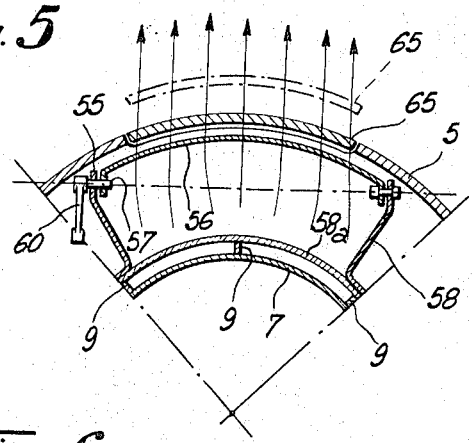
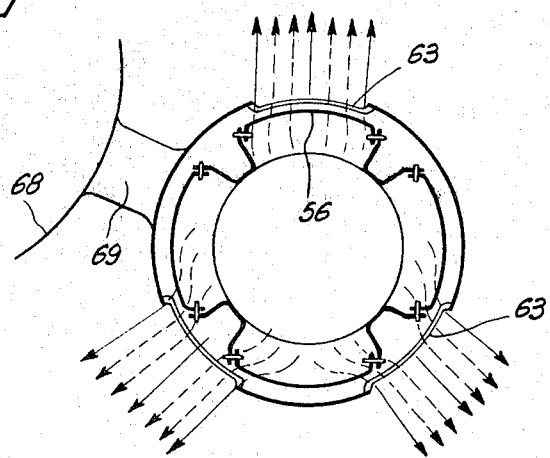
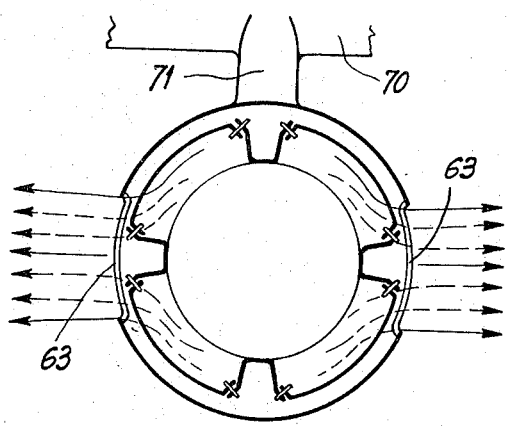

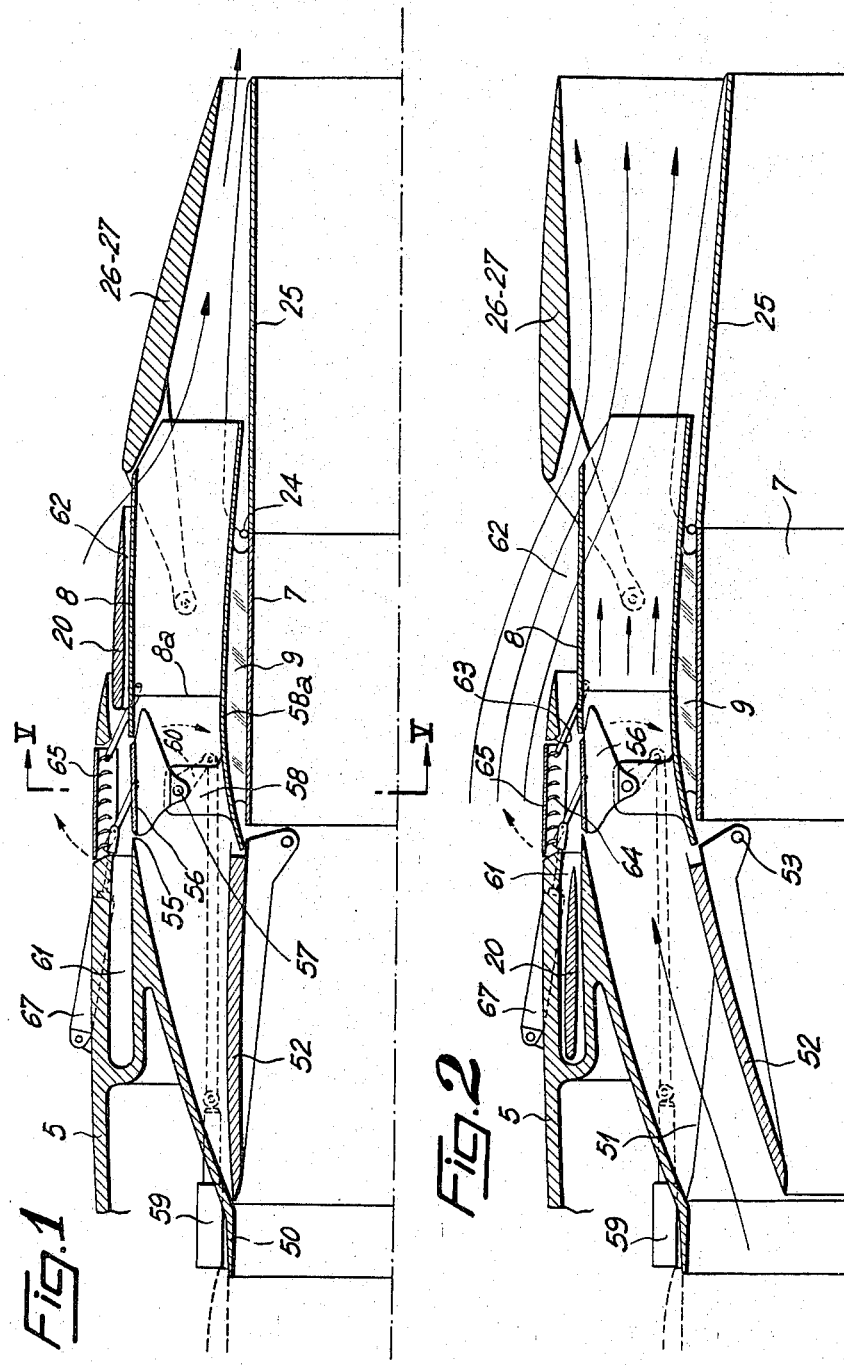

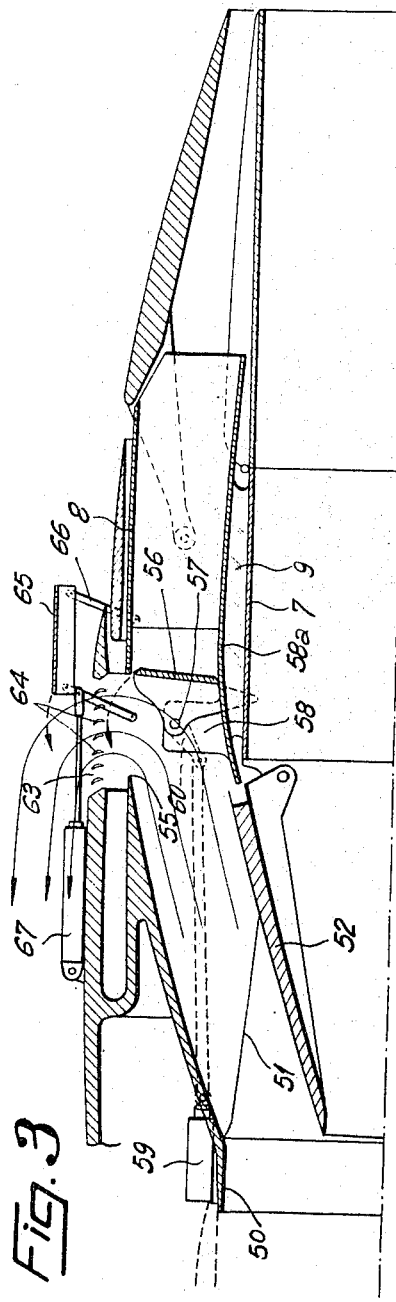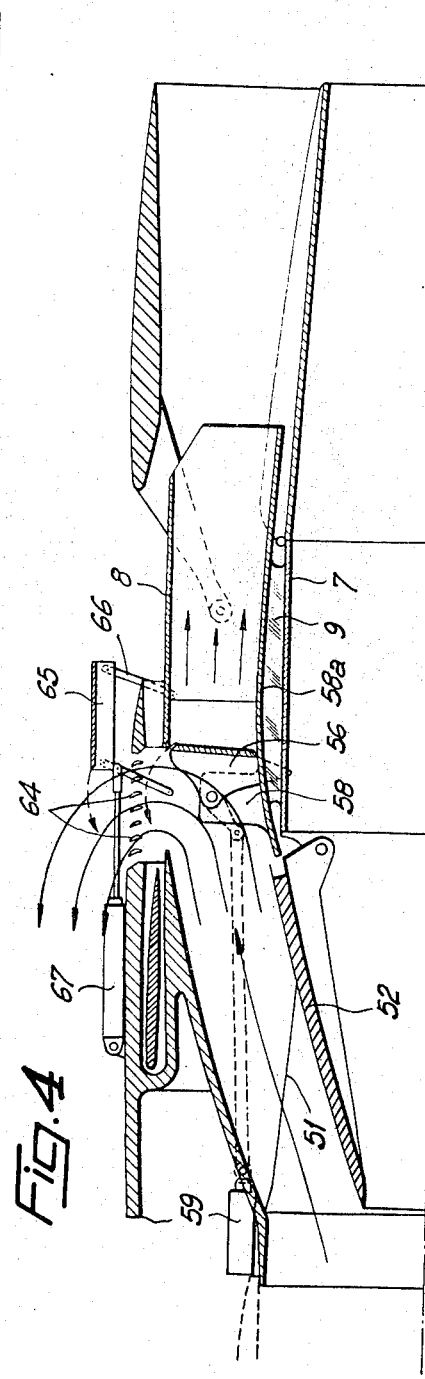

3,493,178
EJECTION NOZZLE DEVICE FOR JET AIRCRAFT
Georges Bruner, Paris, France, assignor to Breguet-Aviation, Velizy, Yvelines, France, a French company
Filed Oct. 16, 1967, Ser. No. 675,552
Claims priority, application France, Oct. 27, 1966, 81,810
Int. Cl. B64d 33/04
U.S. Cl. 239—265.13                         4 Claims

ABSTRACT OF THE DISCLOSURE

The invention relates to discharge nozzles for aircraft and provides means for producing thrust reversal during landing.

---

This invention relates to a discharge nozzle for jet aircraft and is an improvement of a discharge nozzle apparatus for jet aircraft, which is arranged so as to be capable of changing from a position in which it operates as a silencer to a normal flight position, comprising a central discharge passage, and ducts substantially parallel to the said passage and arranged externally of the said passage and about its rear portion, the said passage comprising, upstream of the inlet openings of the said ducts, apertures provided with mobile flaps making it possible either to provide continuity for the central passage or to direct a portion of the flow of discharged gas towards the external ducts so as to effect a dilution of said gas in the air induced from about the said ducts, which causes a considerable reduction in noise. This nozzle is disclosed in my copending patent application No. 443,974 (now Patent 3,333,772).

The present invention provides an improvement by using some gas-deflecting elements for thrust reversal to brake the aircraft when landing.

The following description, taken together with the accompanying exemplary non-limitative drawings, will make clearly apparent how the invention can be carried into effect; features disclosed by the drawings and the text form of course part of the invention.

In the drawings:

FIGURE 1 is a longitudinal half-section through an improved nozzle facility according to this addition in the position for cruising flight;

FIGURE 2 shows the same facility forming a silencer for take-off;

FIGURE 3 shows the same facility at landing without the silencing effect;

FIGURE 4 is a similar view but with silencing effect;

FIGURE 5 is a partial section on a line V—V of FIGURE 1, and

FIGURES 6 and 7 show how this addition is of use with a jet engine disposed laterally of the fuselage (FIG. 6) and for a jet engine suspended below a wing (FIGURE 7).

The embodiment which is shown in the drawings and in which those elements of my patent application No. 443,974, now Patent No. 3,333,772, which are unchanged have the same reference as in my said patent application, derives from the variant shown in FIGURES 10 and 11 of my said patent application. Of course, this addition is of use with all the other embodiments of the invention which form the subject of my said patent application.

In the present example, a casing 5 of a jet engine is pierced, between inlet orifices 8a of outer passages 8 and apertures 51 controlled by moving flaps 52, with slots 55 closable by doors 56 pivoted by way of pivot pins 57 secured to radial supports 58 mounted on a ring 58a which lines the passages 8, to a central body 7 of the nozzle by means of ribs 9. The doors 56 can be operated by means of rams 59 and rod and crank devices 60 and, as can be seen in FIGURES 3 and 4, open by tilting to the rear. The door pivots are so devised that the doors when open prevent gases from departing to the rear, inter alia through the passages 8, clearing of course the slots 55.

The casing is formed with an annular recess 61 adapted to receive a ring 20 adapted to open inlets 62 for the entry of the air induced when the system operates as a silencer (FIGURES 1 and 2). That part of the casing 5 which is outside the recess 61 is formed near the slots 55 with outlets 63 having forwardly extending shutters 64. The outlets 63 can be closed by flaps 65 which, as can be seen in FIGURES 3 and 4, can be raised and moved to the rear by operation of parallelogram-mounted rods 66 and rams 67. The arrangement of the outlets 63 can vary, inter alia in accordance with how the engine is mounted on the aircraft.

In FIGURE 6, the engine is mounted laterally on the fuselage 68 by means of a short lateral arm 69. In this case there are three outlets 63, one of which delivers upwards, the second of which delivers outwards and downwards and the third of which delivers obliquely below the fuselage.

In the variant shown in FIGURE 7, where the engine is mounted below a wing 70 on an arm 71 there are two outlets 63 disposed at opposite ends of a diameter extending substantially parallel to the wing.

In all cases, the slots 55 and doors 56 are devised for optimum supply of the outlets 63; the slots 55 and doors 56 may or may not be provided to the same number as there are outlets 63.

The facility thus described operates as follows:

In cruising flight, the various items are in the position which is shown in FIGURE 1 and in which the flaps 52, 25 cooperate with the nozzles portions 7, 50 to bound a substantially cylindrical passage. The passages to the outside are closed by the doors 56, flaps 65 and ring 20. The elements 26, 27 are clamped in accordance with a truncated cone.

In FIGURE 2, where the device is shown adjusted for take-off with silencing effect, the flaps 52 are open and the ring 20 is advanced to clear the inlets 62. The elements 26, 27 are extended to increase the outlet cross-section of the air and gas mixture, and the elements 25 are moved slightly closer for the same reasons. The doors 56 and flaps 65 stay closed.

To land without using any silencing effect, and starting from the position in which the elements of the facility are shown in FIGURE 1, the flaps 52, doors 56 and flaps 65 are opened. The doors 56 prevent the gases from departing to the rear and so the gases enter the apertures 51, which are directed towards the slots 55 and the outlets 63, whence the shutters 64 direct the gas flow towards the front, reversing the thrust so as to brake the aircraft.

The position of the various items is shown in FIGURE 3.

To brake with silencing effect, the position shown in FIGURE 4 is reached from the position shown in FIGURE 2 just by opening the doors 56 and flaps 65.

I claim:

1. In a discharge nozzle apparatus for a jet engine, comprising an engine casing, a central discharge passage, and ducts substantially parallel to said central passage and arranged externally of said central passage about its rear portion, said ducts adapted to entrain atmospheric air to effect silencing, the improvement comprising a plurality of apertures in the wall of said central passage upstream of the inlet opening of the said ducts, mobile flaps adapted in a first position to close said apertures to thereby provide continuity for said central passage and in a second position to open said apertures to direct a portion of the flow of discharged gas towards said external ducts so as to effect a dilution of said gas in the air entrained by said ducts, slots in said engine casing disposed between said apertures and the entry orifices of said external ducts and associated with doors adapted either to close said slots or to open said slots and simultaneously close said ducts and thereby divert exhaust gas from said ducts outwardly and forwardly to effect a reverse thrust.

2. A nozzle as claimed in claim 1, characterised in that the engine casing is formed near the thrust-reversing slots with closable outlets associated with forwardly directed shutters.

3. A nozzle as claimed in claim 1, characterised in that, in the case of an engine mounted laterally of the fuselage, there are provided three outlets delivering upwards, downwards and outwards.

4. A nozzle as claimed in claim 1, characterised in that in the case of a below-wing engine, two orifices are provided which open along a diameter substantially parallel to the wing.

References Cited

UNITED STATES PATENTS

| | | | |
|---|---|---|---|
| 2,637,164 | 5/1953 | Robson et al. | 239—265.25 |
| 3,036,431 | 5/1962 | Vdolek | 239—265.31 X |
| 3,097,484 | 7/1963 | André et al. | 60—229 X |
| 3,347,467 | 10/1967 | Carl et al. | 239—265.31 |

EVERETT W. KIRBY, Primary Examiner

U.S. Cl. X.R.

239—265.19, 265.29, 265.31